(12) United States Patent
Gentile (10) Patent No.: US 12,023,218 B1
(45) Date of Patent: Jul. 2, 2024

(54) CHEWY-TYPE DENTAL ALIGNMENT SEATING DEVICE WITH SUPPORT HANDLE

(71) Applicant: Sean Gentile, Oakland Park, FL (US)

(72) Inventor: Sean Gentile, Oakland Park, FL (US)

(*) Notice: Subject to any disclaimer, the term of this patent is extended or adjusted under 35 U.S.C. 154(b) by 0 days.

(21) Appl. No.: 17/831,918

(22) Filed: Jun. 3, 2022

Related U.S. Application Data

(60) Provisional application No. 63/196,593, filed on Jun. 3, 2021.

(51) Int. Cl.
*A61C 7/02* (2006.01)

(52) U.S. Cl.
CPC ............ *A61C 7/02* (2013.01); *A61C 2203/00* (2013.01)

(58) Field of Classification Search
CPC ................................... A61C 7/02; A61B 1/24
See application file for complete search history.

(56) References Cited

U.S. PATENT DOCUMENTS

| | | | | |
|---|---|---|---|---|
| 1,023,822 A | * | 4/1912 | Dubay .................... | A61J 17/02 606/235 |
| 1,749,632 A | * | 3/1930 | Ferris .................... | A63B 23/032 606/234 |
| 2,694,397 A | * | 11/1954 | Herms .................... | A61B 1/24 D24/176 |
| 3,411,723 A | * | 11/1968 | Kohn .................... | B01L 3/18 294/7 |
| D246,054 S | * | 10/1977 | Bissonnette ............ | D24/194 |
| 5,263,976 A | * | 11/1993 | Williams ............... | A61F 5/566 606/235 |
| 5,939,049 A | | 8/1999 | Miller et al. | |
| 6,098,627 A | * | 8/2000 | Kellner ................... | A61C 5/90 128/862 |
| 6,158,439 A | * | 12/2000 | Streetman ............ | A61H 23/00 128/898 |
| D558,345 S | | 12/2007 | Witt | |
| 8,062,030 B2 | | 11/2011 | Saubers | |
| 8,167,612 B2 | | 5/2012 | DeSanti | |
| D721,438 S | | 1/2015 | Layzell | |
| D798,458 S | | 9/2017 | Way et al. | |
| 10,143,538 B2 | | 12/2018 | Pechersky | |
| D838,368 S | * | 1/2019 | Rifani .................... | D24/133 |
| D879,301 S | | 3/2020 | Morehead | |
| 10,675,125 B1 | | 6/2020 | Ly | |
| 10,695,148 B2 | | 6/2020 | Florman et al. | |

(Continued)

FOREIGN PATENT DOCUMENTS

| | | |
|---|---|---|
| CN | 107693137 | 2/2018 |
| KR | 101152709 | 6/2012 |

*Primary Examiner* — Ralph A Lewis
(74) *Attorney, Agent, or Firm* — John Rizvi; John Rizvi, P.A.—The Patent Professor®

(57) ABSTRACT

A dental alignment device positioning tool for use in safely and effectively positioning or repositioning dental alignment devices on teeth is provided. The positioning tool generally includes a handle having an elongate shaft and a soft chewy formed on and extending from a first end of the elongate shaft. A handle end portion is formed on a second end of the elongate shaft to enhance the user's control of the chewy to prevent choking. The handle, including the shaft and the handle end portion, and the chewy are integrally formed as a single monolithic structure. The chewy may be flavored to enhance the enjoyment of the user.

20 Claims, 4 Drawing Sheets

(56) References Cited

U.S. PATENT DOCUMENTS

| | | |
|---|---|---|
| 11,291,527 B2 * | 4/2022 | Scherr ................. A61C 7/08 |
| 2005/0097693 A1 | 5/2005 | Bransky et al. |
| 2007/0031787 A1 * | 2/2007 | Sabbagh ............... A61C 5/90 |
| | | 433/136 |
| 2007/0178419 A1 | 8/2007 | Berman et al. |
| 2008/0160473 A1 * | 7/2008 | Li ........................ A61C 7/08 |
| | | 433/3 |
| 2011/0209715 A1 * | 9/2011 | Burdumy ............. A61C 5/90 |
| | | 128/861 |
| 2013/0130199 A1 * | 5/2013 | Palm ..................... A61C 3/00 |
| | | 433/173 |
| 2015/0297330 A1 * | 10/2015 | Ficacci ............. A61C 19/063 |
| | | 433/140 |
| 2017/0007360 A1 | 1/2017 | Kopelman et al. |
| 2019/0099241 A1 | 4/2019 | Way et al. |
| 2020/0038141 A1 | 2/2020 | Crouse |
| 2020/0275994 A1 | 9/2020 | Cain et al. |
| 2021/0186660 A1 * | 6/2021 | Dayan ................... A61C 7/02 |

\* cited by examiner

CHEWY-TYPE DENTAL ALIGNMENT SEATING DEVICE WITH SUPPORT HANDLE

CROSS-REFERENCE TO RELATED APPLICATION

This application claims the benefit of U.S. Provisional Patent Application No. 63/196,593, filed on Jun. 3, 2021, which is incorporated by reference herein in its entirety.

FIELD OF THE INVENTION

The present invention relates generally to dental alignment devices, and more particularly, to a chewy-type dental alignment seating and/or positioning device provided with an integral support handle.

BACKGROUND OF THE INVENTION

Misaligned teeth are a substantial cause of embarrassment, difficulty eating and even pain. They discourage the person from smiling and can lead to a lack of confidence. Eating with badly misaligned teeth is often troublesome causing the person difficulty in chewing and having food get caught between the misaligned teeth. In extreme cases, badly aligned teeth can hit other teeth, sensitive gums and even the tongue resulting in discomfort and pain.

Dental alignment devices are devices that are attached to or positioned over the badly or misaligned teeth to urge them into the correct or a better position. The devices function by moving the individual teeth in the jaw bones over a period of time until the teeth are in the desired position. One such types of devices are conventional braces. The conventional braces include pads that are cemented or otherwise attached to individual teeth and a series of wires connecting the pads. The pads are permanently attached for extended periods of time, sometimes years, and are routinely adjusted to slowly move the teeth into the desired positions.

Unfortunately, as noted, the conventional type braces may take years to accomplish the desired result. Further, the metal of the wires and the pads of the conventional braces are unsightly, discouraging the user from smiling and continuing to instill a lack of self confidence in the wearer. Still further, the conventional braces are expensive and require frequent trips to the orthodontist to make the adjustments. More importantly, being formed of metal wires, cuts to the tongue and gums are common leading to pain and bleeding. Given the prevalence of communicable diseases in society today, bleeding is a situation that should be avoided at all costs.

Newer type dental alignment devices have been developed that do away with the unsightly pads and wires of conventional braces. The newer type of devices are similar to sports mouth guards that fit over rather than on the teeth. These dental alignment devices are more simple to use and less expensive. The orthodontist or even the patient obtains an impression mold of the misaligned teeth on a gum-like material and upper and lower sets of dental alignment devices are manufactured with the positions receiving the teeth slightly altered to gently move the teeth to the desired positions. The process can be repeated over time by successive sets of dental alignment devices each moving the teeth slightly further into the correct positions. One such dental alignment device is commercially known as Invisalign® device.

However, since the upper and lower sets of these newer dental alignment devices are simply pressed over the teeth and not permanently affixed as with conventional braces, they have a tendency to want to move off the teeth due to the differing positions of the teeth and the pockets they are received in.

Various devices have been developed to encourage the dental alignment devices to remain in place. For example, vibratory devices are available along with other similarly expensive and complicated devices, but they reduce and even eliminate the cost effective nature of using the newer type dental alignment devices in the first place.

A chewy is a device used by the patient or dental alignment device wearer to urge the dental alignment devices back into position over the teeth. The chewy is a soft, foam like stick that the user positions in the mouth and bites down on to urge the dental alignment devices into place. This may occur several times a day.

However, the chewy device is often hard to hold and gets wet from use in the mouth. This can lead to the chewy device slipping out of the user's hand and moving back into the mouth. Choking can be a significant and life threatening issue should the chewy get lodged in the back of the mouth or even swallowed. This is especially true with children who have small mouths, less dexterity and minimal attention spans.

Accordingly, there is need for a solution to at least one of the aforementioned problems. For instance, there is an established need for a cost-effective solution for maintaining chewy-type devices in place relative to upper and/or lower sets of guard-type dental alignment devices.

SUMMARY OF THE INVENTION

The present invention is directed to a dental alignment device positioning tool for use in safely and effectively positioning or repositioning dental alignment devices on teeth. The positioning tool generally includes a handle having an elongate shaft and a soft chewy formed on and extending from a first end of the elongate shaft. A handle end portion is formed on a second end of the elongate shaft to enhance the user's control of the chewy and to prevent choking. The handle, including the shaft and the handle end portion, and the chewy are integrally formed as a single monolithic structure. The chewy may be flavored to enhance the enjoyment of the user.

In a first implementation of the invention, a positioning tool for use in positioning a dental alignment device on teeth is provided may include:
 a handle, including an elongate shaft having a first end and an opposite, second end;
 an elongate and compressible chewy, extending from and integrally formed with the first end of the shaft; and
 an enlarged, handle end portion extending from and integrally formed with the second end of the shaft; wherein
 the shaft, the chewy and the handle end portion form a single monolithic structure.

In a second aspect, the shaft may be straight and elongately formed along a longitudinal direction.

In another aspect, the chewy may be straight and elongately formed along the longitudinal direction.

In another aspect, the shaft and the chewy may be coaxial.

In another aspect, the shaft may be generally flat.

In yet another aspect, the chewy may be non-rotationally symmetrical about a central longitudinal axis of the chewy.

In another aspect, the chewy may be generally flat.

In another aspect, an orientation of a generally flat, top surface of the shaft may be the same as an orientation of a generally flat, top surface of the chewy.

In another aspect, an orientation of a generally flat, bottom surface of the shaft may be the same as an orientation of a generally flat, bottom surface of the chewy.

In yet another aspect, the shaft may be more rigid than the chewy.

In another aspect, the shaft may be thinner than the chewy.

In another aspect, the handle end portion may protrude radially outward of the shaft along a full periphery of the shaft.

In another aspect, the handle end portion may be bulbous.

In yet another aspect, the chewy may include a flavoring.

In another aspect, the chewy may be shorter than the shaft.

In another aspect, the shaft may be thinner than the chewy.

In another aspect, the handle end portion may be thicker than the chewy.

In yet another aspect, the handle may be about 1.5 to 2 inches long.

In a second implementation of the invention, a method of positioning a dental alignment device over a user's teeth may include the steps of:
providing a positioning tool comprising:
a handle, including an elongate shaft having a first end and an opposite, second end,
an elongate and compressible chewy, extending from and integrally formed with the first end of the shaft, and
an enlarged, handle end portion extending from and integrally formed with the second end of the shaft, wherein
the shaft, the chewy and the handle end portion form a single monolithic structure;
grasping the positioning tool by the shaft;
inserting the chewy between at least one of an upper and lower set of a dental alignment device; and
biting down on the chewy to engage the chewy with the dental alignment device with sufficient force to urge the dental alignment device onto teeth.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward a positioning tool for positioning and/or repositioning or compressing one or more dental alignment devices down onto teeth of a patient or user.

Figure 1:
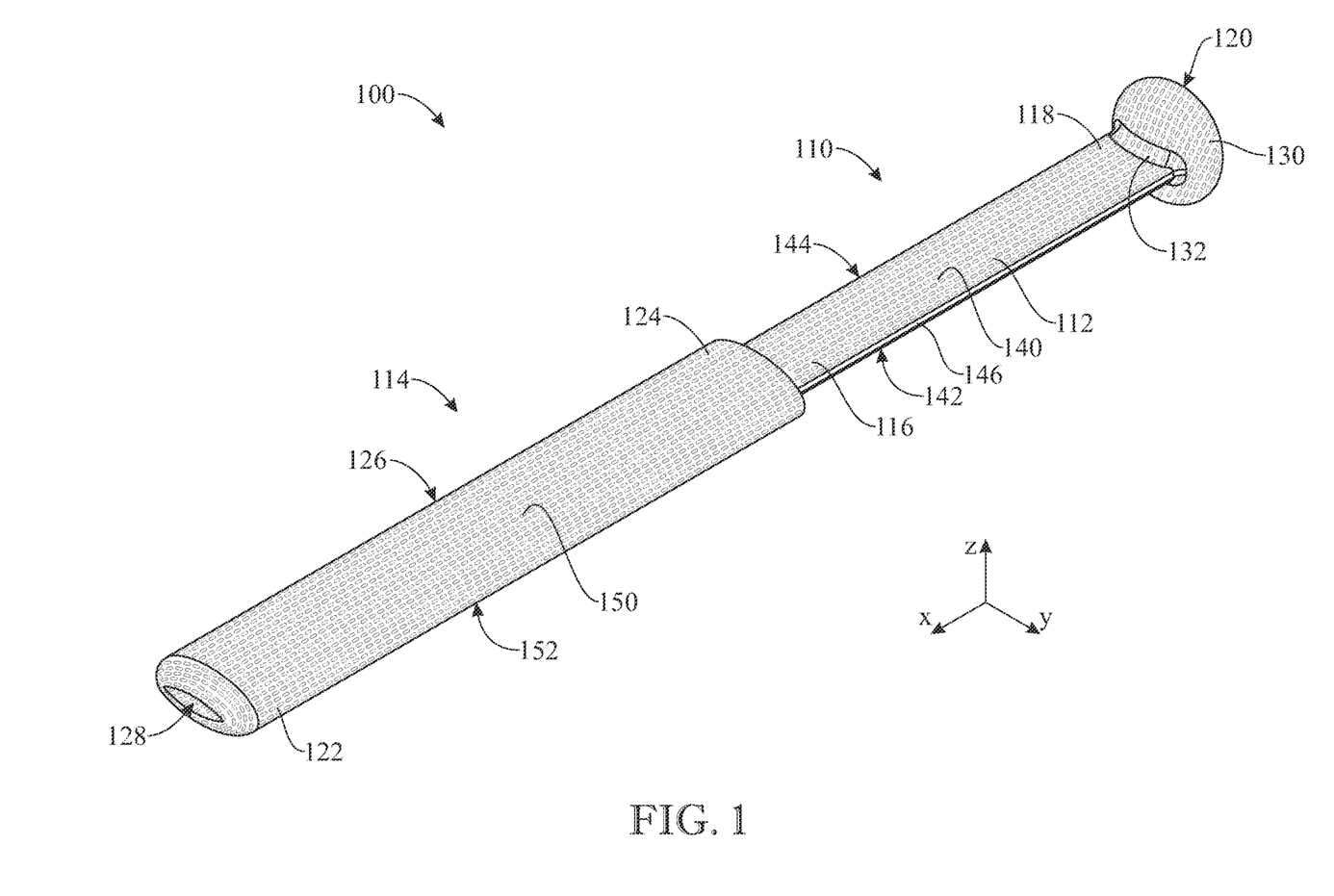
FIG. 1 presents an isometric view of a chewy-type dental alignment device positioning tool with an integral support handle in accordance with an illustrative embodiment of the present invention including a chewy-type positioning device and an integral support handle having an enlarged end.
Figure 2:
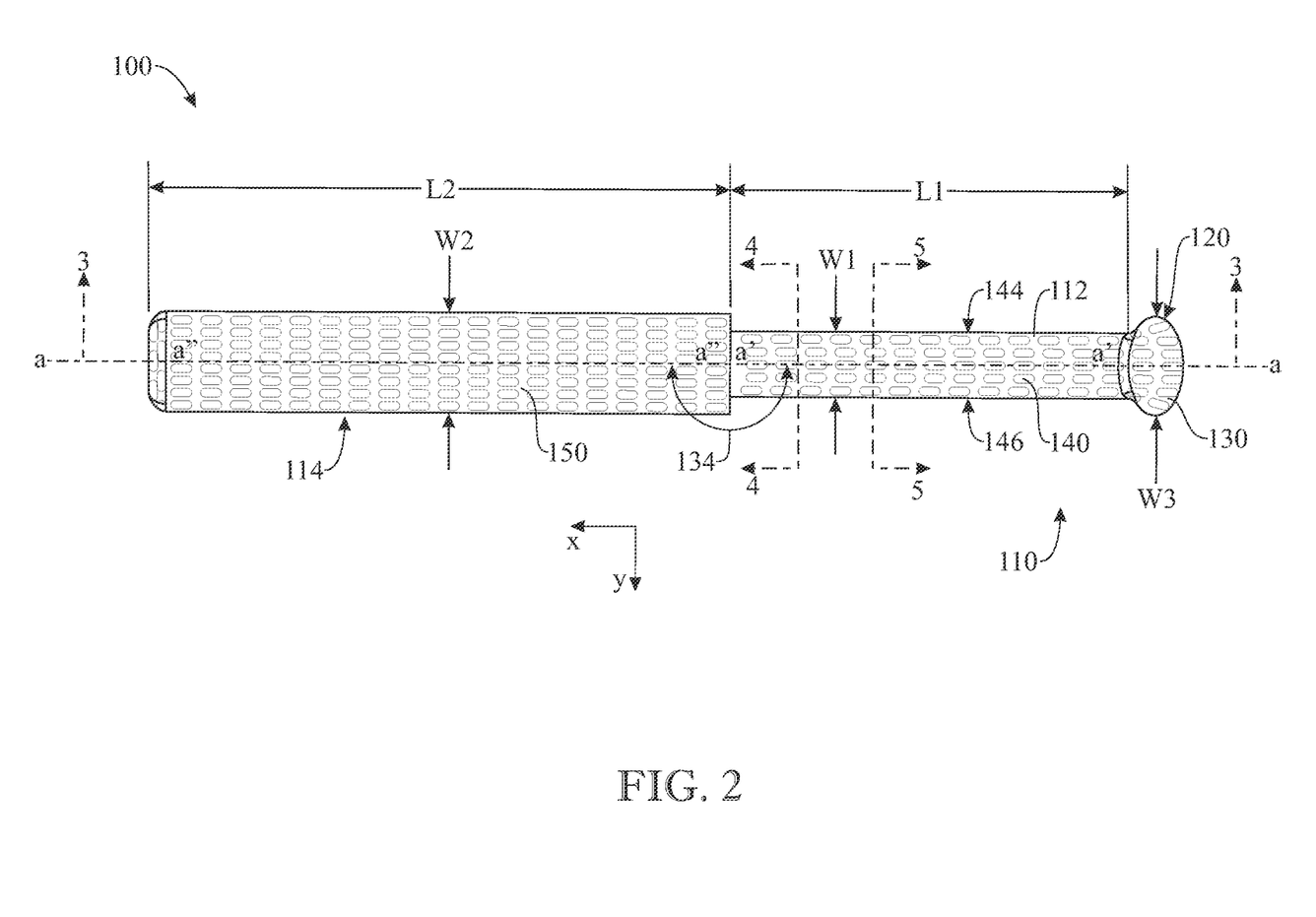
FIG. 2 presents side plan view of the chewy-type dental alignment device positioning tool with an integral support handle in accordance with the illustrative embodiment of the present invention illustrated in FIG. 1.
Figure 3:
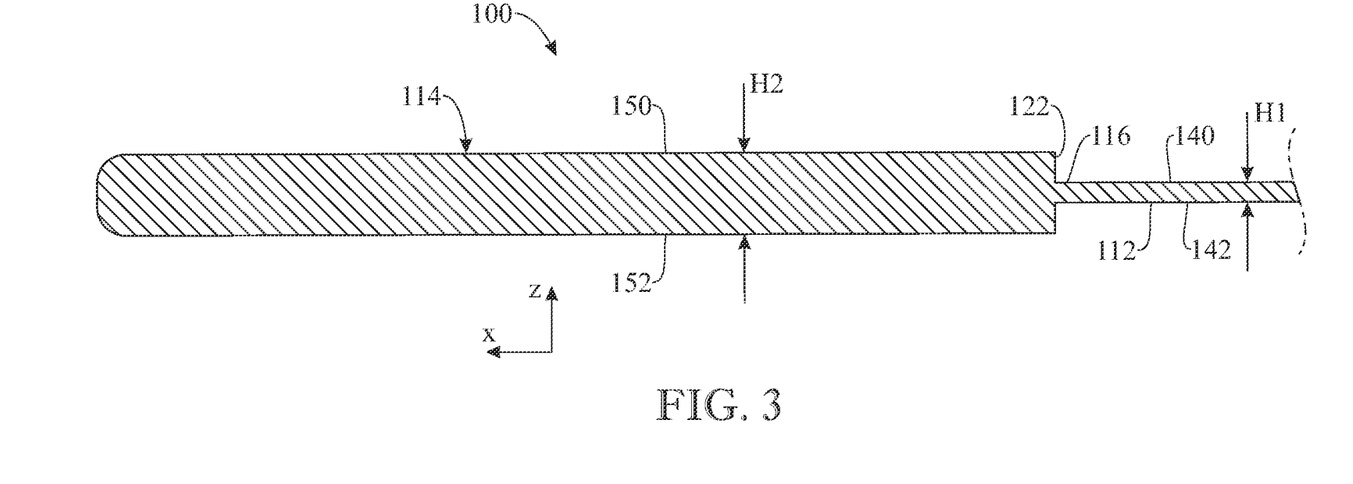
FIG. 3 presents a partial side sectional view, taken along lines 3-3 of FIG. 2, of the chewy-type dental alignment device positioning tool with an integral support handle illustrating the monolithic nature of the chewy-type dental alignment device positioning tool with an integral support handle.

Referring initially to FIGS. 1-3, and initially with regard to FIG. 1, a positioning tool for assisting in installing dental alignment devices and subsequently maintaining the dental alignment devices in position on a patient's or user's teeth, hereinafter positioning tool 100, is illustrated in accordance with an exemplary embodiment of the present invention. The positioning tool 100 is used to press down dental alignment devices, such as, but not limited to, Invisalign® type alignment devices, on a patient's teeth and generally includes a handle 110 having an elongate shaft 112. The positioning tool 100 further includes an elongate and relatively soft, compressible foam stick or "chewy" 114. The chewy 114 is formed on and extends from a distal or first end 116 of the shaft 112 of the handle 110. As shown, the chewy 114 may be formed along a longitudinal direction x, and may be generally straight. The handle 110 may also be formed along the longitudinal direction x, and may be generally straight. The handle 110 may extend longitudinally from the chewy 114 such that the handle 110 and chewy 114 jointly form an elongated, generally straight body or part. The chewy 114 and the shaft 112 of the handle 110, and more preferably, the entire handle 110, may be integrally formed into a single-piece unit, as shown.

A proximal or second end 118 of the handle shaft 112 is provided with an enlarged, bulbous portion or handle end portion 120 facilitating manipulation of the disclosed positioning tool 100 as it is used to position or reposition dental alignment devices on teeth as discussed in more detail hereinbelow. The handle end portion 120 also prevents choking during use as discussed in more detail hereinbelow. The chewy 114 has a free distal or first end 122 and a proximal or second end 124 formed integrally with the first end 116 of the handle shaft 112.

The chewy 114 depicted herein is of a known variety having a hollow body portion 126 defining a bore 128 which extends partially down through the hollow body portion 126. The provision of the bore 128 in the hollow body portion 126, along with the soft, foam-like consistency of the body portion 126 of the chewy 114, allows the chewy 114 to gently compress a dental alignment device down onto teeth to assist in maintaining the dental alignment device on the teeth during initial repositioning of the teeth by the dental alignment device.

The disclosed handle 110 of the positioning tool 100 of the present invention is provided to aid the user in manipulating the chewy 114 and acts as a safety device to prevent the user from inadvertently choking on the chewy 112 as discussed in more detail hereinbelow. The shaft 112 of the handle 110 is relatively rigid compared to the soft and compressible consistency of the chewy 114 to facilitate control of the chewy 114 during use.

The handle end portion 120 of the handle 110 is, in the illustrated embodiment, formed as a relatively round or bulbous enlarged knob 130 including a juncture 132 integrally formed with the second end 118 of the shaft 112 of the handle 110. The enlarged knob 130 helps prevent the user from slipping off or losing their grip on the shaft 112 and/or the chewy 114 during use in the generally wet environment of the mouth area and teeth. This helps ensure the chewy 114 does not go too far into the mouth such and prevents the user from choking on the chewy 114.

As mentioned heretofore, the chewy 114 and the shaft 112 of the handle 110 may be arranged in the longitudinal direction x; in such a configuration, the shaft 112 and the chewy 114 form an angle 134 of generally 180 degrees, as shown. Such arrangement of the shaft 112 in the same direction of the chewy 114 allows the handle 110 to serve as a guide as to the (longitudinal) direction in which the chewy 114 must be inserted into the mouth. Referring now to FIG. 2, as shown, the shaft 112 of the handle 110 of the present embodiment is specifically oriented coaxially with the chewy 114 along a common, central longitudinal axis a-a. Having the shaft 112 and the chewy 114 coaxially formed further enhances the ability of the shaft 112 to guide the user during insertion of the chewy 114 into the mouth, as shaft 112 allows the user to insert the chewy 114 straight into the mouth and over the dental alignment devices being pressed down onto teeth; furthermore, the coaxial shaft 112 serves as a reference of the exact position of the chewy 114 inside the user's mouth without having to look down onto the positioning tool 100 or into a mirror. Alternatively, an axis a'-a' of the shaft 112 of the handle 110 may be oriented at an angle 134 other than 180 degrees from an axis a"-a" of the chewy 114 to give the user a different angle of insertion into the mouth.

The shaft 112 of the handle 110 of the positioning tool 100 has an overall length (dimension along the longitudinal direction x) of L1 and the chewy 114 has a length L2. In a non-limiting example, the shaft 112 may have a length L1 of about 1.5 to 2 inches. In the disclosed embodiment, the length L1 of the shaft 112 of the handle 110 of the positioning tool 100 is shorter than the length L2 of the chewy 114 of the positioning tool 100. This further ensures that the chewy 114 will not be inserted too far into the mouth during use to prevent choking. The shaft 112 of the handle 110 has a width, or dimension along the transverse direction y perpendicular to the longitudinal direction x, indicated as W1, and the chewy 114 has a width W2 greater than the width W1 of the shaft 112, such as to reduce weight and visibility of the handle 110. In turn, the knob 130 of the handle end portion 120 of the handle 110 has a width W3 greater than the width W1 of the shaft 110, helping prevent the user from losing their grip on the shaft 112 of the handle 110 of the positioning tool 100.

Figure 5:
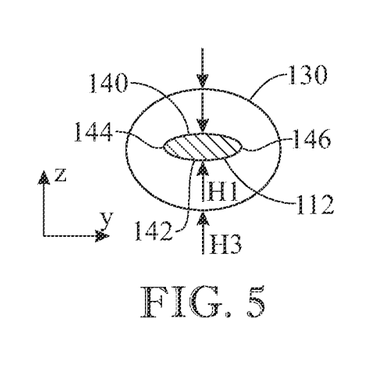
FIG. 5 presents a cross-sectional view, taken along lines 5-5 of the handle shaft and a handle end portion of the chewy-type dental alignment device positioning tool with an integral support handle.

Turning now to FIG. 3, the shaft 112 of the handle 110 of the positioning tool 100 has a height (dimension along a vertical direction z perpendicular to the longitudinal and transverse directions x and y, respectively) indicated as H1, while the chewy 114 of the positioning tool 100 has a height H2 greater than the height H1 of the shaft 112 of the handle 110. In this embodiment, the height of the shaft 112 of the handle 110 is substantially less than the height H2 of the chewy 114, as best shown in FIG. 3. In turn, as shown in FIG. 5, the height H1 of the shaft 112 of the handle 110 is also less than a height H3 of the knob 130 of the handle end portion 120 to prevent choking. Furthermore, as observed in FIGS. 1 and 6, the height H3 of the knob 130 of the handle end portion 120 is greater than the height H2 of the chewy 114. Such relative configurations of heights H1, H2 and H3, particularly when combined, contribute to prevent accidental choking with the positioning tool 100.

Figure 6:
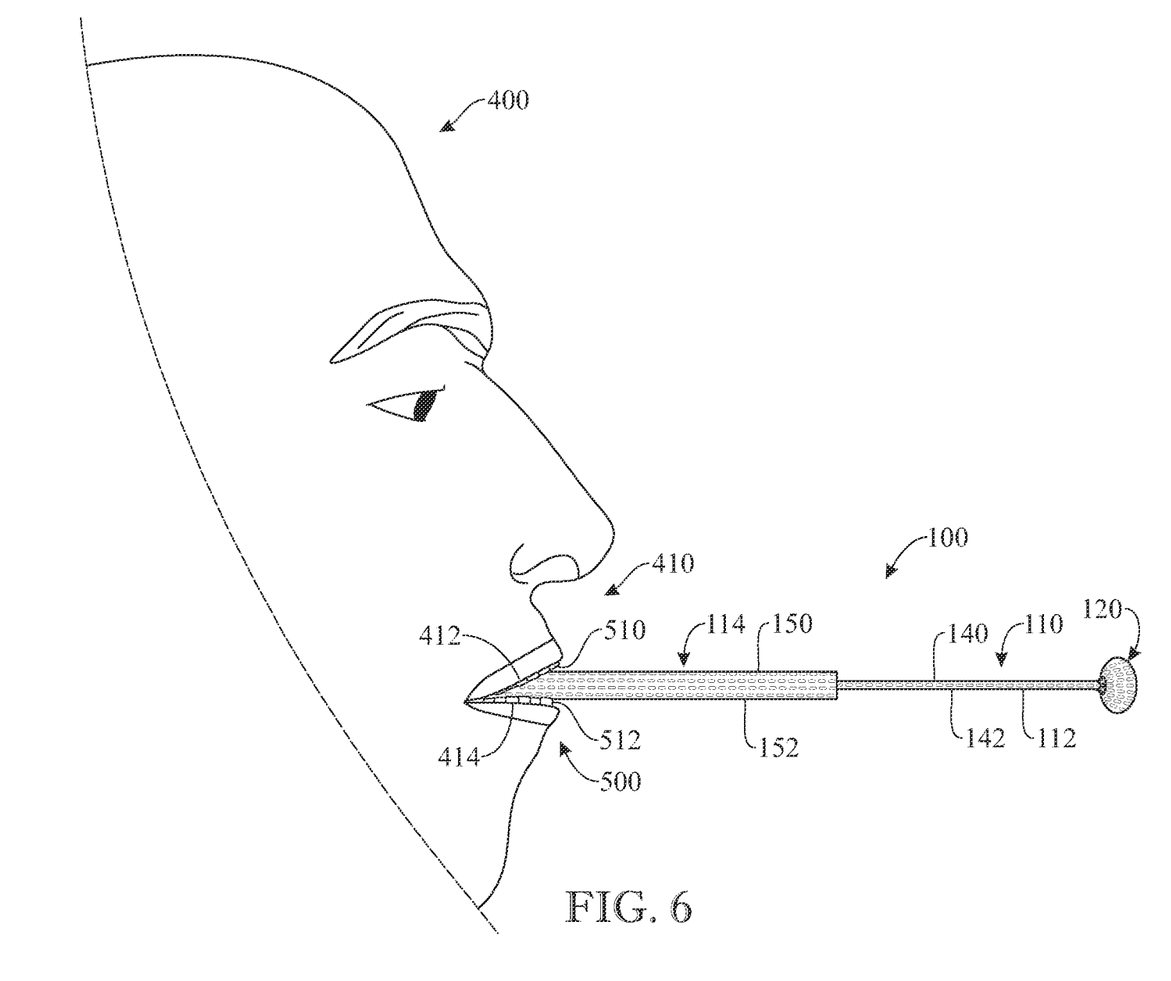
FIG. 6 presents perspective view of the chewy-type dental alignment device positioning tool with an integral support handle with the chewy of the chewy-type dental alignment device positioning tool with an integral support handle positioned in a mouth of a user to aid in aligning upper and lower dental alignment devices positioned in the mouth of the user.

With reference to FIGS. 1-3, the shaft 112 of the present embodiment has a generally flat or tongue depressor shape, such as oval, with height H1 being significantly less than width W1 of the shaft 112, such that top and bottom sides 140 and 142 of the shaft 112 are significantly wider than a height of left and right sides 144 and 146 of the shaft 112. Such a flat configuration of the shaft 112 serves as a reference to the user on how to correctly vertically position the chewy 114 inside the mouth, and is thus particularly advantageous when combined with a chewy 114 that is configured to be inserted in a particular position (relative to longitudinal axis a"-a") into the mouth, such as in cases where the chewy 114 is non-rotationally symmetric along the longitudinal axis a"-a" of the chewy 114. For instance, the chewy 114 of the present embodiment is non-rotationally symmetric along axis a"-a", is generally flat-shaped and provided with an oval cross section, and is configured to be flatly inserted into the user's mouth in the position of FIGS. 1 and 6, with wider top and bottom sides 150 and 152 oriented upward and downward, respectively, as best shown in FIG. 6. In this embodiment, the relatively flat shaft 112 is formed and arranged having an orientation which is analogous to the orientation of the relatively flat chewy 114, with the relatively wider top sides 140 and 150 of the shaft 112 and chewy 114 oriented in a same direction (upward), and the relatively wider bottom sides 142 and 152 oriented in the same direction (downward). The shaft 112 and the chewy 114 both having a flat shape and generally same orientation of the flat shape allows the shaft 112 to provide an intuitive reference and reminder of how to flatly orient and insert the chewy 114 into the mouth (with the top side 150 oriented upward).

Figure 4:
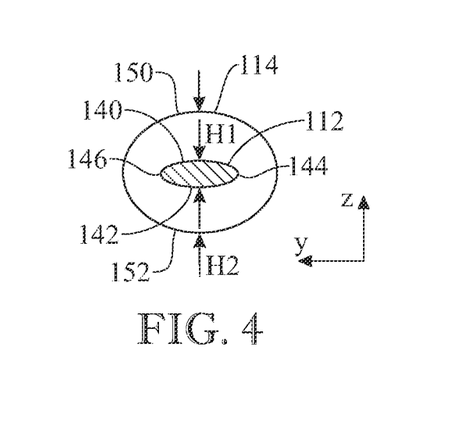
FIG. 4 presents a cross-sectional view, taken along lines 4-4 of FIG. 2, of a handle shaft and chewy of the of the chewy-type dental alignment device positioning tool with an integral support handle of the present invention.

As shown in FIG. 4, the chewy 114 is elongate and has a generally oval cross section or shape, and the shaft 112 of the handle 110 has an even flatter oval shape compared to the more rounded oval shape of the chewy 114. In an alternative embodiment, the cross-sectional shape of the shaft 112 of the handle 110 may be similarly oval to the chewy 114. Still further, the shaft 112 of the handle 110 may have other cross sections such as, but not limited to, round, square, rectangular, star shaped or even a non-symmetrical cross section.

The handle end portion 120 of the handle 110 is provided to maintain the user's grip on the shaft 112 of the handle 110, contributing to prevent the positioning tool 100 from slipping from the user's hand, minimizing or eliminating the chances of the user swallowing and/or choking on the chewy 114. Further, the handle end portion 120 provides a positive point of contact with the handle 110 to assist the user in manipulating the positioning tool 100, and thus the chewy 114, during use. In the disclosed embodiment, the handle end portion 120 is shown formed as the knob 130 having a generally oval or egg shape. As best shown in FIGS. 1 and 2, the handle end portion 120 may be larger than the shaft 112 of the handle 100 in both the transverse direction y and the vertical direction z, enhancing the positive point of contact effect. Alternatively or additionally, and preferably additionally, as best shown in FIG. 5, the handle end portion 120 may extend radially outward from the handle 112 about an entire periphery of the handle 112, further enhancing the positive point of contact effect, providing a more comfortable grip, and further contributing to prevent choking with or swallowing of the positioning tool 100. While the present handle end portion 120 is generally oval or egg-shaped, alternative embodiments are contemplated in which the handle end portion 120 may have other shapes such as, but not limited to, round, square, etc. In more specific embodiments, the handle end portion 120 may be decoratively shaped to enhance the enjoyment of the user. For example, to encourage children to use the positioning tool 100 to maintain their dental alignment devices in position, the handle end portion 120 may be shaped and even decorated as a tooth, a teddy bear, flowers, etc.

With specific reference to FIGS. 2 and 3, the positioning tool 100 is formed as a single unitary and monolithic structure including the handle 110, comprising the shaft 112 and the handle end portion 130, and the chewy 114. The monolithic structure of the positioning tool 100 of the present embodiment is formed from a single material. The positioning tool 100 may be formed from a variety of plastic and/or polymeric materials that allow for the differences in the consistencies of the relatively rigid shaft 112 and handle end portion 120 of the handle 110 and the compressible configuration of the chewy 114. By forming the positioning tool 100 as a single, unitary and monolithic structure, the chances of the chewy 114 breaking off of the shaft 112 of the handle 100, and thus causing choking, are minimized or eliminated.

The materials chosen for forming the disclosed positioning tool 100 may also be chosen for their ability to include or be treated with a variety of substances. For example, the material chosen may include or have the ability to absorb or be treated with a variety of flavorings to enhance the enjoyment of the user. This may be particularly applicable where the positioning tool 100 is to be used by children. Such flavorings may include mint, strawberry, watermelon and may be subtly incorporated into or onto the chewy 114. The disclosed positioning tool may also be formed with a variety of colors and/or designs or logos (not shown).

Additionally, the positioning tool 100 may be provided as a single-use device that is discarded after a single use, or as a sterilizable device that can be easily sterilized by the user. The forms of sterilization may include mechanical sterilization such as, but not limited to, boiling the positioning tool 100 in hot water, or may include chemical sterilization with various bio-compatible disinfectants. Where available, the positioning tool 100 may be configured to be disinfected in an auto-clave.

The positioning tool 100 itself is formed by first forming the shapes of the handle 110, including the shaft 112 and the handle end portion 120, and the chewy 114. This can be accomplished by compressing and/or molding the raw material in a press or set of dies. A mandrel may be used to form the bore 128 (FIG. 1) of the chewy 114.

Thereafter, the individual sections of the position tool are treated to create the soft, foam-like consistency of the chewy 114 and the relatively rigid consistency of the handle shaft 112 and the handle end portion 120. This can be accomplished through known mechanical and/or chemical processes.

Turning now to FIG. 6, in use, the positioning tool 100 is provided to assist in maintaining dental alignment devices in position over teeth in a user's mouth to ensure the dental alignment devices stay in place to effect change in positions of individual teeth. As shown, a user 400, having a mouth 410 containing upper and lower teeth 412 and 414 initially inserts a dental alignment device 500, having an upper set 510 and a lower set 512, such that the upper set 510 of the dental alignment device 500 is positioned over the upper teeth 412 of the mouth 410 and the lower set 512 of the dental alignment device 500 is positioned over the lower teeth 414 of the mouth 400.

The user 400 typically retains the dental alignment device 500 in the mouth 410 for a set period of time each day. The period of time may be continuously over 24 hour periods or only for smaller periods of time each day depending on how the use of the dental alignment device 500 is prescribed. Since the dental alignment device 500 is attempting to slightly and gently move individual teeth into new positions to straighten out the teeth, the pressure on the dental alignment device 500 from the relatively well stet teeth tends to push, urge or pop off the upper and lower sets 510 and 512, respectively, off of the upper and lower teeth 412 and 414, respectively.

The disclosed positioning tool 100 is provided to urge and press the upper and lower sets 510 and 512 of the dental alignment device 500 back onto the upper and lower teeth 412 and 414 in the user mouth 410. Specifically, the positioning tool 100 is grasped by the handle 110 and manipulated to position the chewy 114 between the upper and lower sets 510 and 512 of the dental alignment device 500. The relatively flat shape of the shaft 112 of the handle 110 formed in coaxial alignment and matching orientation with the relatively flat shape of the chewy 114 may assist in the user rapidly and conveniently identifying the correct orientation (with relatively wide and flat top sides 140, 150 up) of the shaft 112 and chewy 114 prior to insertion into the mouth 410. The user 400 can then gently bite down on the chewy 114, and more specifically, on the relatively flat top and bottom sides 150 and 152, which face the upper and lower teeth 412 and 414, respectively, with sufficient force to cause the chewy 114 to press the upper and lower sets 510 and 512 back into position on the upper and lower teeth 412 and 414. This operation of the positioning tool 100 can take place at prescribed intervals during the day or any time the user feels the dental alignment device 500 is shifting out of position. In a specific method of use, the user performs the repositioning of the dental alignment device 500 with the positioning tool for 10 minutes a day.

It should be noted that, importantly, the user 400 maintains full control of the position of the chewy 114 of the positioning tool 100 in the user's mouth 410 through the handle 110 such that the chewy 114 is not inserted too far into the user's mouth 410. Still further, the provision of the enlarged handle end portion 120 on the proximal or second end 118 of the handle shaft 112 of the handle 110 prevents the user's hand, which is gripping the shaft 112, from slipping off of the handle 110 and prevents the chewy 114 from going down the user's throat and choking the user.

Therefore, the disclosed novel dental alignment device positioning tool 100, including the handle 110, allows a user to safely and effectively position and/or reposition dental alignment devices on their teeth without the risk of choking on the dental alignment device while using the dental alignment device.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A positioning tool for use in positioning a dental alignment device on teeth, the positioning tool comprising:
    a handle, including an elongate shaft having a first end and an opposite, second end;
    an elongate, soft, foam chewy, the chewy having a hollow body portion defining a bore, the hollow body portion in conjunction with the bore allowing the chewy to be compressible and the chewy extending from and integrally formed with the first end of the shaft; and
    an enlarged, handle end portion extending from and integrally formed with the second end of the shaft; wherein
    the shaft, the chewy and the handle end portion form a single monolithic structure.

2. The positioning tool of claim 1, wherein the shaft is straight and elongately formed along a longitudinal direction.

3. The positioning tool of claim 2, wherein the chewy is straight and elongately formed along the longitudinal direction.

4. The positioning tool of claim 3, wherein the shaft and the chewy are coaxial.

5. The positioning tool of claim 1, wherein the shaft is generally flat.

6. The positioning tool of claim 5, wherein the chewy is non-rotationally symmetrical about a central longitudinal axis of the chewy.

7. The positioning tool of claim 6, wherein the chewy is generally flat.

8. The positioning tool of claim 7, wherein an orientation of a generally flat, top surface of the shaft is the same as an orientation of a generally flat, top surface of the chewy.

9. The positioning tool of claim 8, wherein an orientation of a generally flat, bottom surface of the shaft is the same as an orientation of a generally flat, bottom surface of the chewy.

10. The positioning tool of claim 1, wherein the shaft is more rigid than the chewy.

11. The positioning tool of claim 1, wherein the shaft is thinner than the chewy.

12. The positioning tool of claim 1, wherein the handle end portion protrudes radially outward of the shaft along a full periphery of the shaft.

13. The positioning tool of claim 1, wherein the handle end portion is bulbous.

14. The positioning tool of claim 1, wherein the chewy comprises a flavoring.

15. The positioning tool of claim 1, wherein the chewy is shorter than the shaft.

16. The positioning tool of claim 1, wherein the shaft is thinner than the chewy.

17. The positioning tool of claim 1, wherein the handle end portion is thicker than the chewy.

18. The positioning tool of claim 1, wherein the handle is about 15 to 2 inches long.

19. A positioning tool for use in positioning a dental alignment device on to the positioning tool comprising:
    a handle, including a straight, elongate shaft having a first end and an opposite, second end, the shaft elongately formed along a longitudinal direction, and including a bulbous enlarged knob having a juncture integrally formed with the second end of the shaft of the handle;
    a straight, elongate, foam chewy, the chewy having a hollow body portion defining a bore, the hollow body portion in conjunction with the bore allowing the chewy to be compressible and the chewy extending from and integrally formed with the first end of the shaft, the chewy elongately formed along the longitudinal direction; and
    an enlarged, handle end portion extending from and integrally formed with the second end of the shaft; wherein
    the shaft, the chewy and the handle end portion form a single monolithic structure; and further wherein
    the shaft is more rigid than the chewy.

20. A positioning tool for use in positioning a dental alignment device on teeth, the positioning tool comprising:
    a handle, including a straight, elongate and generally flat shaft having a first end and an opposite, second end, the shaft elongately formed along a longitudinal direction, and including a bulbous enlarged knob having a juncture integrally formed with the second end of the shaft of the handle, wherein a height and a width of the knob are greater than a height and a width of the shaft;
    a straight, elongate, generally flat, foam chewy, the chewy having a hollow body portion defining a bore, the hollow body portion in conjunction with the bore allowing the chewy to be compressible and the chewy extending from and integrally formed with the first end of the shaft, the chewy elongately formed along the longitudinal direction; and
    an enlarged, handle end portion extending from and integrally formed with the second end of the shaft; wherein
    the shaft, the chewy and the handle end portion form a single monolithic structure; wherein
    the shaft is more rigid than the chewy; and further wherein
    an orientation of a generally flat, top surface of the shaft is the same as an orientation of a generally flat, top surface of the chewy.

* * * * *